(12) United States Patent
Tatapudi et al.

(10) Patent No.: US 8,599,694 B2
(45) Date of Patent: *Dec. 3, 2013

(54) CELL COPY COUNT

(75) Inventors: Vamsi M. Tatapudi, Santa Clara, CA (US); Chien-Hsien Wu, Cupertino, CA (US); Philip Chen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/091,338

(22) Filed: Apr. 21, 2011

(65) Prior Publication Data

US 2011/0194450 A1 Aug. 11, 2011

Related U.S. Application Data

(63) Continuation of application No. 11/583,155, filed on Oct. 19, 2006, now Pat. No. 7,953,008.

(60) Provisional application No. 60/735,213, filed on Nov. 10, 2005.

(51) Int. Cl.
*H04L 12/26* (2006.01)

(52) U.S. Cl.
USPC ............................................. 370/235

(58) Field of Classification Search
None
See application file for complete search history.

(56) References Cited

U.S. PATENT DOCUMENTS

| | | |
|---|---|---|
| 5,748,629 A | 5/1998 | Caldara et al. |
| 5,757,771 A | 5/1998 | Li et al. |
| 5,850,399 A | 12/1998 | Ganmukhi et al. |
| 6,259,698 B1 | 7/2001 | Shin et al. |
| 6,424,624 B1 | 7/2002 | Galand et al. |
| 6,452,901 B1 | 9/2002 | Yang et al. |
| 6,519,226 B1* | 2/2003 | Kumar et al. .................. 370/230 |
| 6,621,825 B1* | 9/2003 | Walsh et al. .................. 370/412 |
| 6,650,645 B2 | 11/2003 | Scott et al. |
| 6,934,289 B2 | 8/2005 | Lee |
| 7,075,927 B2 | 7/2006 | Mo et al. |
| 7,245,586 B2 | 7/2007 | Bitar et al. |
| 7,502,366 B1 | 3/2009 | Erimli et al. |
| 7,953,002 B2 | 5/2011 | Opsasnick |
| 7,953,008 B2 | 5/2011 | Tatapudi et al. |
| 2001/0038607 A1 | 11/2001 | Honda |
| 2004/0042477 A1 | 3/2004 | Bitar et al. |
| 2007/0104102 A1* | 5/2007 | Opsasnick .................... 370/230 |

OTHER PUBLICATIONS

Notice of Allowance received for U.S. Appl. No. 11/583,155, mailed on Feb. 25, 2011, 9 pages.

Non-Final Office Action received for U.S. Appl. No. 11/595,978, mailed Jun. 30, 2010, 18 pages.

(Continued)

*Primary Examiner* — Raj Jain

(74) *Attorney, Agent, or Firm* — McDermott Will & Emery LLP

(57) ABSTRACT

The present invention is directed to a network device, method and apparatus for processing data. The present invention includes at least one ingress module for performing switching functions on incoming data. The invention further includes a memory management unit (MMU) for storing the incoming data, and at least one egress module for transmitting the incoming data to at least one egress port. Further, in the present invention, the memory management unit further comprises a cell copy count pool (CCP) memory, wherein the CCP determines when a memory cell can be made available.

20 Claims, 11 Drawing Sheets

(56) References Cited

OTHER PUBLICATIONS

Notice of Allowance received for U.S. Appl. No. 11/595,978, mailed on Jan. 27, 2011, 14 pages.

Final Office Action received for U.S. Appl. No. 11/583,155, mailed on Feb. 8, 2010, 9 pages.

Notice of Allowance received for U.S. Appl. No. 11/583,155, mailed on Nov. 16, 2010, 9 pages.

* cited by examiner

CELL COPY COUNT

CROSS-REFERENCE TO RELATED APPLICATIONS

This application is a continuation of application Ser. No. 11/583,155, filed on Oct. 19, 2006, now issued as U.S. Pat. No. 7,953,008, which claims the benefit of U.S. Provisional Patent Application Ser. No. 60/735,213, filed on Nov. 10, 2005. The subject matter of these earlier filed applications is hereby incorporated by reference.

BACKGROUND OF THE INVENTION

1. Field of the Invention

The invention relates to a method and apparatus for high performance switching in local area communications networks. In particular, the invention relates to a buffer management and flow control mechanism that utilizes priority groups in the handling of packets in the network device, so that flows of data and types of data can be managed in ways that allow for all resources to be efficiently utilized.

2. Description of the Related Art

A switching system may include one or more network devices, such as an Ethernet switching chip, each of which includes several modules that are used to process information that is transmitted through the device. Specifically, the device may include at least one ingress module, a Memory Management Unit (MMU) and at least one egress module. The ingress module may include switching functionality for determining to which destination port a packet should be directed. The MMU is used for storing packet information and performing resource checks. The egress module may be used for performing packet modification and for transmitting the packet to at least one appropriate destination port. One of the ports on the device may be a CPU port that enables the device to send and receive information to and from external switching/routing control entities or CPUs. Some devices also include a CPU processing module through which the device interfaces with external CPU ports.

In the processing of datagrams, such as packets, certain packets may receive preferential treatment when compared to other packets. As such, certain packets may be assigned a higher Quality of Service (QoS), such that those packets are given preferred treatment. This preferred treatment may be given, for example, to packets where time sensitive receipt of those packets is important. In many prior art systems, many QoS states are assigned, so that varying degrees of handling and prioritization can be provided. However, even if a small amount of bandwidth is allocated to a particular QoS state and is not used, that bandwidth is "wasted," in that it could be utilized by other resources. Thus, there is a need in the prior art for systems that allow for dynamic management of buffers and thresholds to allow for efficient utilization of all resources of a network device.

BRIEF DESCRIPTION OF THE DRAWINGS

For the present invention to be easily understood and readily practiced, various embodiments will now be described, for purposes of illustration and not limitation, in conjunction with the following figures.

DETAILED DESCRIPTION OF THE PREFERRED EMBODIMENTS

The present invention is directed to many embodiments that provide many useful features with respect to buffer management and thresholding. These features are briefly discussed below and in greater detail in the sections that follow. These features include the grouping of Quality of Service Priorities into Priority Groups (PGs) and guarantees of minimum bandwidth for each Priority Group, and each port. The buffer management and flow control mechanism also includes dynamic sharing of buffer space on a per-port and per-priority group basis, per-priority group and per-priority flow control and guarantees buffer space allocation (per-priority group headroom) on a per-input port/PG basis to guarantee lossless behavior. A reserved "global headroom" buffer space is used on a first-come, first served basis to allow non-lossless traffic to complete a partially received packet. This allows for the network device to behave in a fairer manner for large and small packet sizes. User-controllable modes allow the user to select the intra-packet discard policy when a threshold is reached and a new mechanism to guarantee a minimum buffer allocation on a per-output port/queue basis which still makes maximum use of the buffer for multicast packets.

Figure 1:
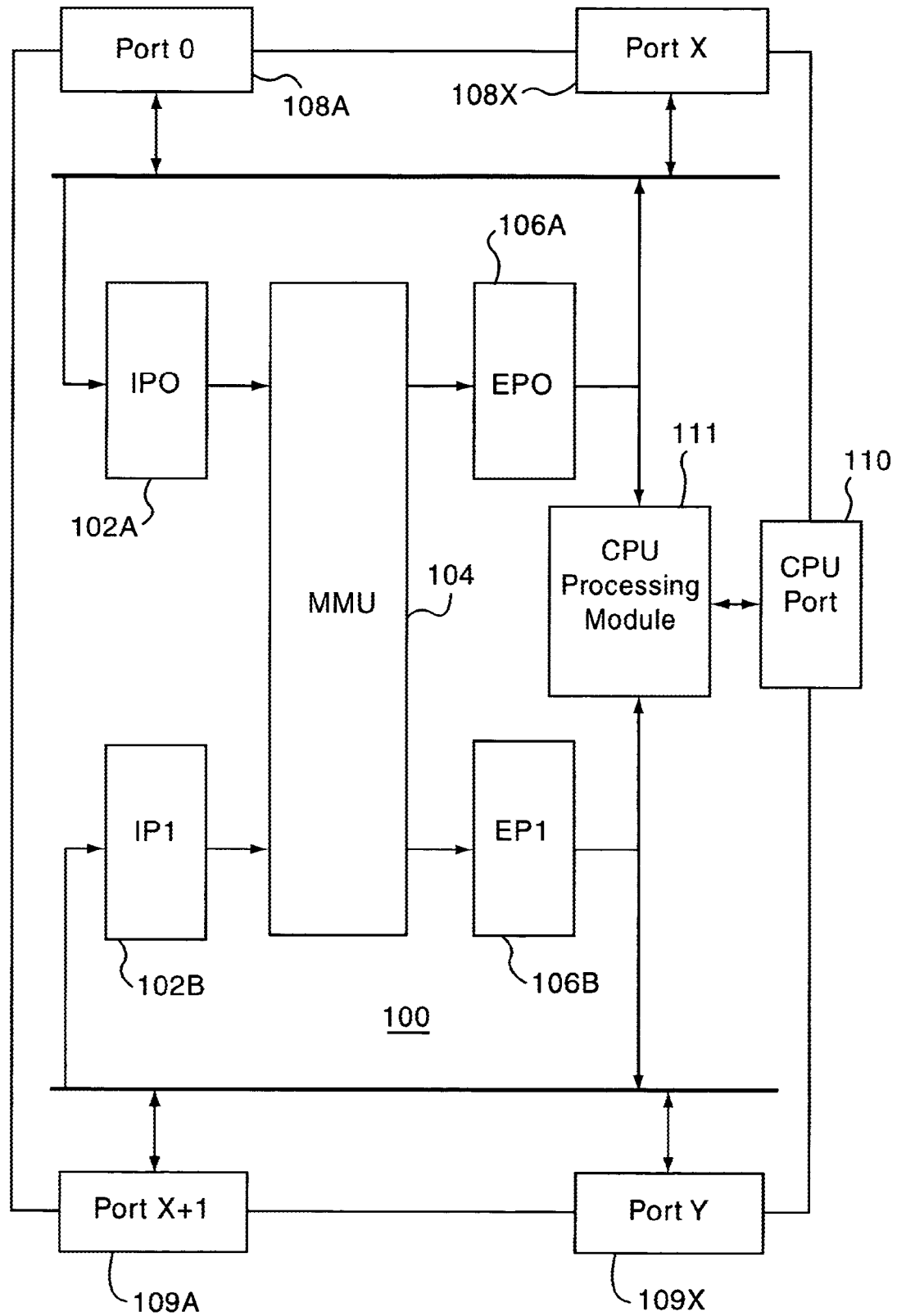
FIG. 1 is an illustration of a network device in which an embodiment of the present invention may be implemented.

FIG. 1 illustrates a network device, such as a switching chip, in which an embodiment the present invention may be implemented. Although the examples used in describing the embodiments of the present invention describe the network device 100 as a switch, the network device may also be directed to a router, bridge or any other network device known in the art. Device 100 includes ingress modules 102A and 102B, a MMU 104, and egress modules 106A and 106B. Ingress modules 102A and 102B are used for performing switching functionality on an incoming packet. MMU 104 is used for storing packets and performing resource checks on each packet. Egress modules 106A and 106B are used for performing packet modification and transmitting the packet to an appropriate destination port. Each of Ingress modules 102A, 102B, MMU 104 and Egress modules 106A and 106B include multiple cycles for processing instructions generated by that module. Device 100 implements a dual-pipelined approach to process incoming packets. One aspect which effects the performance of device 100 is the ability of the pipelines to process one packet every clock cycle. It is noted that the embodiment illustrated in FIG. 1 shows dual-pipelines, the present invention may also be applicable to systems that use a single pipeline or more than two pipelines.

Device 100 can also include a number of ports to send and receive data, such as Port 0 to PortX, 108A-108X, and Port X+1 to PortY, 109A-109X. The ports can be separated and are serviced by different ingress and egress port modules to support the dual-pipeline structure. One or more internal fabric high speed ports, for example a highspeed port, or more external Ethernet ports may be configured from the above-discussed ports. The network device can also include a CPU port 110 and a CPU processing module 11 to communicate with an external CPU. High speed ports are used to interconnect various network devices in a system and thus form an internal switching fabric for transporting packets between external source ports and one or more external destination ports. As such, high speed ports are not externally visible outside of a system that includes multiple interconnected network devices. CPU port 110 can be used to send and receive packets to and from external switching/routing control entities or CPUs. Device 100 interfaces with external/off-chip CPUs through a CPU processing module 111, which interfaces with a PCI bus that connects device 100 to an external CPU.

Network traffic also enters and exits device 100 through external ports 108A-108X and 109A-109X. Specifically, traffic in device 100 is routed from an external source port to one or more unique destination ports. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global trunk group identifier (TGID). According to an embodiment, device 100 can support up to 128 trunk ports, with up to 8 members per trunk port, and up to 29 external physical ports.

Once a packet enters device 100 on a source port 109A-109X or 108A-108X, the packet is transmitted to one of the ingress modules 102A or 102B for processing. Packets may enter device 100 from a XBOD or a GBOD. The XBOD is a block that has one 10GE/12G MAC and supports packets from high speed ports and the GBOD is a block that has 12 10/100/1G MAC and supports packets from other ports.

The architecture of the network device provides for the ability to process data received quickly and also allows for a flexibility of processing. A part of this flexibility comes from the pipeline structure that is used to process packets once they are received. Data from the packet and attributes of that packet move through the modules of the network device, discussed above, in a pipeline structure. Each stage in the pipeline structure requires a set number of clock cycles and the packets are processed in order. Therefore, the packet is parsed, table lookups are performed, a decision routing process is performed and the packet is modified, before being sent out on an egress port. Each stage in the pipeline performs its function so that the overall function of the network device is achieved.

Figure 2:
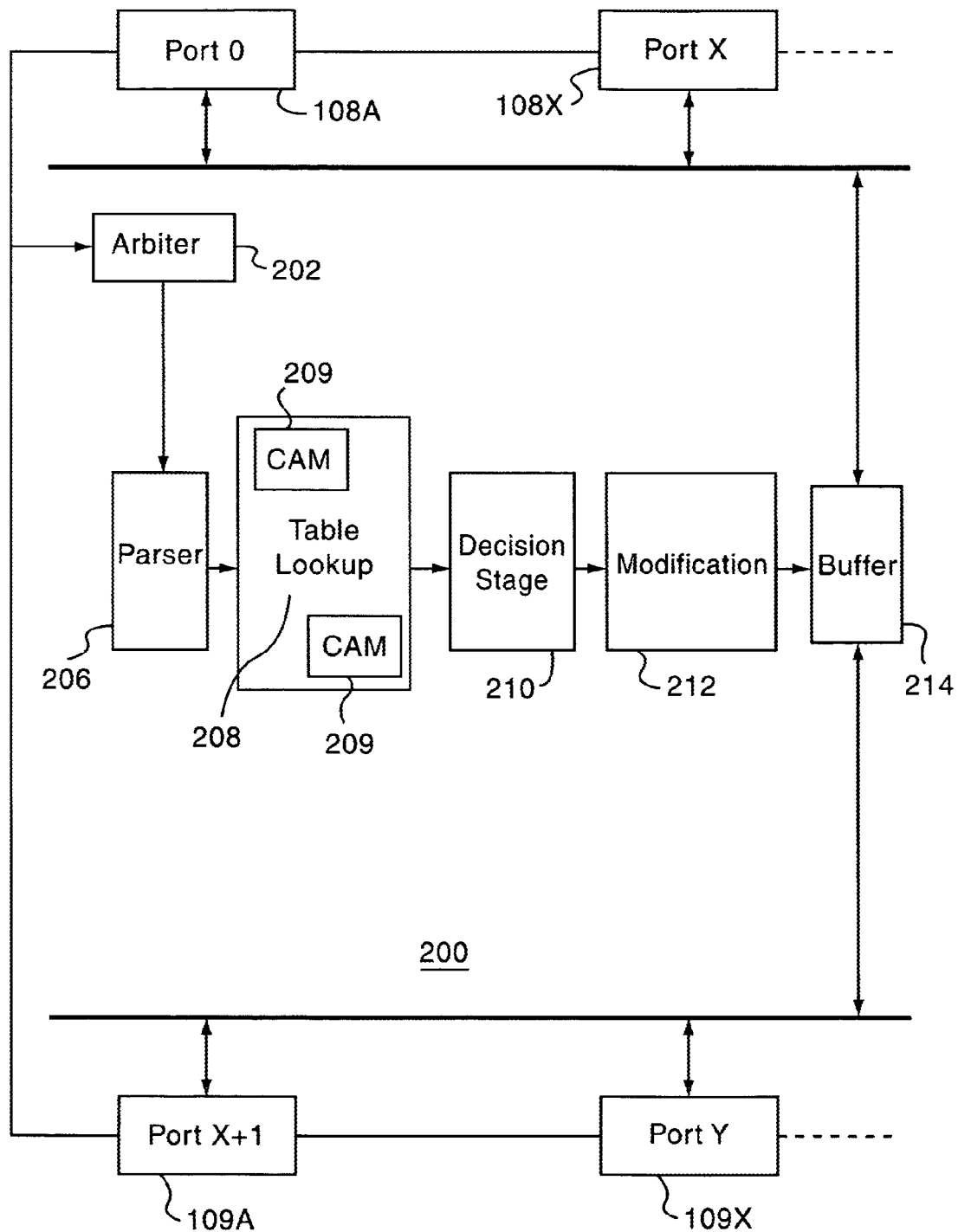
FIG. 2 illustrates a centralized egress pipeline architecture of an ingress stage in an exemplary embodiment of the present invention.

FIG. 2 illustrates a centralized egress pipeline architecture 200 of egress stages 106A and 106B, i.e. one side of the dual-pipeline. The egress pipeline can include an arbiter 202, a parser 206, a table lookup stage 208, multiple content-addressable memories (CAMs) 209, a decision stage 210, a modification stage 212 and a data buffer 214. Arbiter 202 provides arbitration for accessing egress pipeline 200 resources between packet data and control information from MMU and information from the CPU. Parser 206 performs packet parsing for table lookups and modifications. Table lookup stage 208 performs table lookups for information transmitted from parser 206, through use of the CAMs 209. The decision stage 210 is used for deciding whether to modify, drop or otherwise process the packet. The modification stage 212 makes modifications to the packet data based on outputs from previous stages of the ingress module.

Arbiter 202 collects packet data and control information from MMU 104 and read/write requests to registers and memories from the CPU and synchronizes the packet data and control information from MMU 104 and writes the requests from the CPU in a holding register. Based on the request type from the CPU, arbiter 202 generates pipeline register and memory access instructions and hardware table initialization instructions. After arbiter 202 collects packet data, CPU requests and hardware table initialization messages, it generates an appropriate instruction. According to an embodiment, arbiter 202 generates a Start Cell Packet instruction, an End Cell of Packet instruction, a Middle Cell of Packet instruction, a Start-End Cell of Packet instruction, a Register Read Operation instruction, a Register Write Operation instruction, a Memory Read Operation instruction, a Memory Write Operation instruction, a Memory Reset Write Operation instruction, a Memory Reset Write All Operation instruction and a No Operation instruction. Egress pipeline resources associated Start Cell Packet instructions and Start-End Cell of Packet instructions are given the highest priority by arbiter 204. End Cell of Packet instructions, Middle Cell of Packet instructions, Register Read Operation instructions, Register Write Operation instructions, Memory Read Operation instructions and Memory Write Operation instruction receive the second highest priority from arbiter 204. Memory Reset Write Operation instructions and Memory Reset Write All Operation instructions receive the third highest priority from arbiter 204. No Operation instructions receive the lowest priority from arbiter 204.

After receiving an instruction from arbiter 204, the parser 206 parses packet data associated with the Start Cell of Packet instruction and the Start-End Cell of Packet instruction using the control information and a configuration register transmitted from arbiter 206. According to an embodiment, the packet data is parsed to obtained L4 and L3 fields which appear in the first 148 bytes of the packet. Table lookup stage 208 then receives all packet fields and register values from parser 206.

Figure 3:
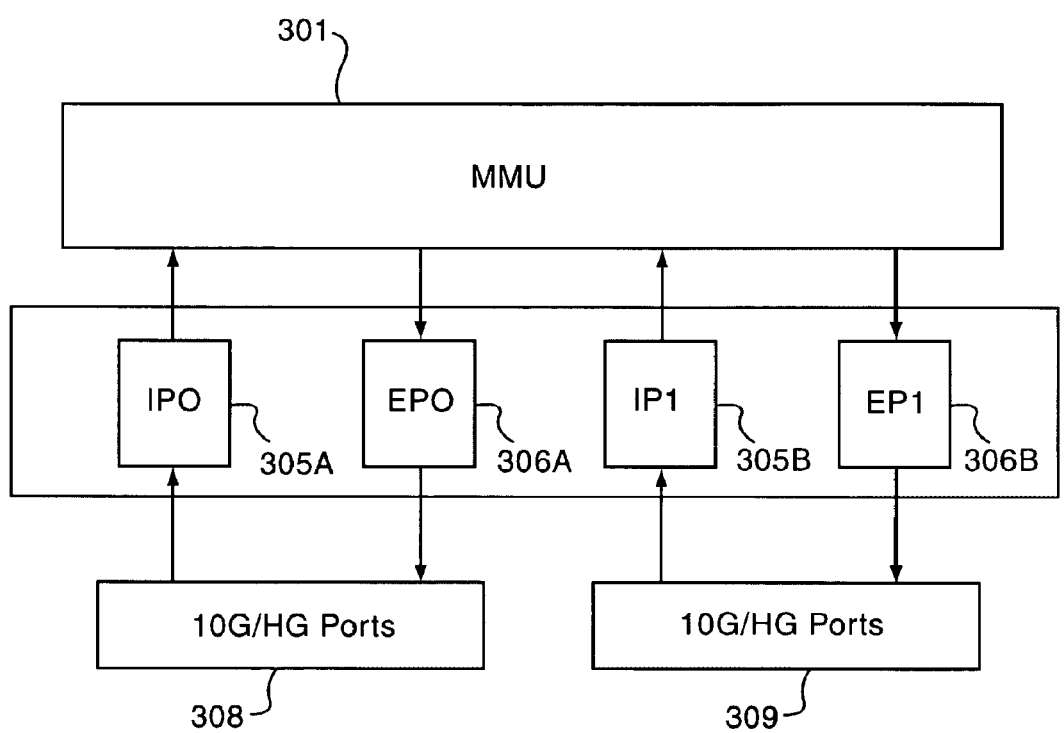
FIG. 3 illustrates multiple pipelines for controlling flows of data from the ports to and from the MMU in an exemplary embodiment of the present invention.
Figure 4:
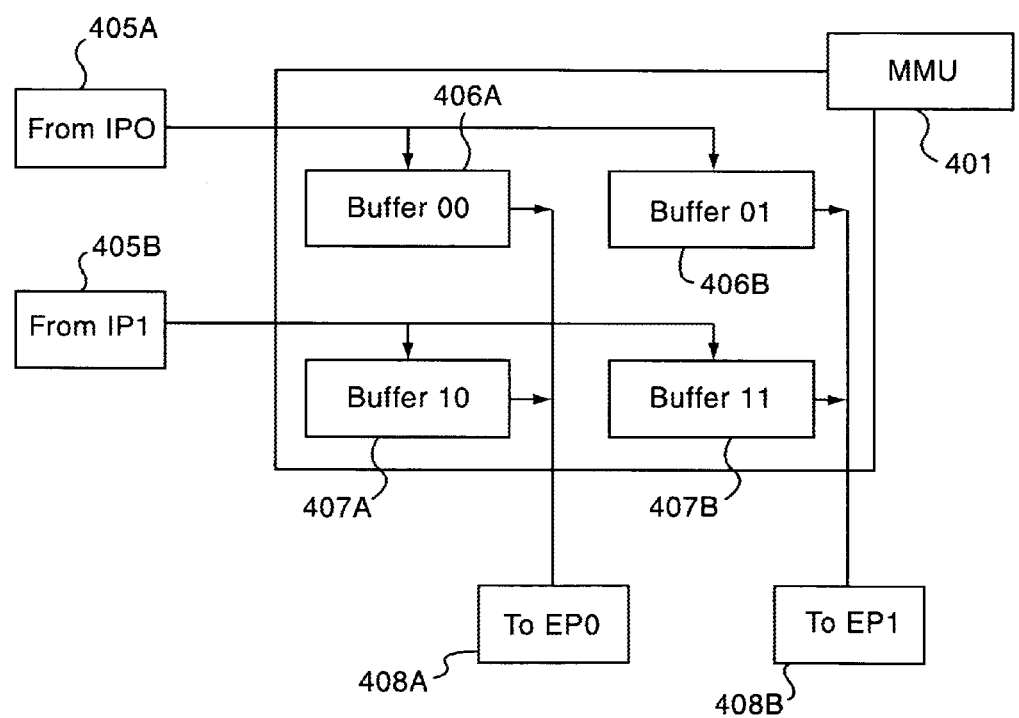
FIG. 4 illustrates an MMU data path in an exemplary embodiment of the present invention.

As discussed above, the network device can, according to certain embodiments, use two sets of IP/EP pipelines to support 20 ports of 10GE (or 16 ports of 12G highspeed) as shown in FIG. 3. Thus, in the illustrated embodiment, ports 0-9 308 are served by IP0 305A and EP0 306A, and ports 10-19 309 are served by IP1 305B and EP1 306B. Both sets of modules communicate with a single MMU 301. To support 20 ports of 10GE, the MMU 401 is split into 4 crosspoint buffers, as illustrated in FIG. 4. Thus, data coming from IP0 405A is received by buffers 00 and 01 (406A & 406B) before being sent to EP0 and EP1 (408A & 408B), with buffers 10 and 11 (707A & 407B) receiving data from IP1 405B. It should be noted that the multiple buffers can be reduced to a single shared buffer by speeding up the memory. Each buffer handles 10 input ports and 10 output ports, making the bandwidth requirement for each memory unit 100 Gbps, bi-directional, according to certain embodiments.

The Admission control, including thresholds, and enqueueing occur at each cross-point buffer and are independent of the other crosspoint buffers. Therefore, separate cell buffer counts and queues are provided at each crosspoint. This means that each output port will own two physical queues for each logical queue implemented. The two physical queues have packets that are of the same class to the same output port, but from different sets of input ports. The output port and queue scheduling should to be done on a unified basis for each port. Each port scheduler should see the physical queues at each of two crosspoint buffers, but only needs a scheduling database (min/max values) on a per logical queue basis. One difference from prior art network devices is the addition of 2 extra queues at each highspeed output port, named the SC and QM queues. The CONTROL opcode can be used to map packets in the SC queue when in a specific mode. Legacy packets that are E2EFC or E2ECC packets (as determined by the DMAC address) will be mapped into the QM queue of the egress highspeed port when in the specific mode.

The MMU uses the XQ queuing structure with 2 k XQ's per port (29 ports), in one embodiment. The XQ's are very different for the GE, HG (i.e. highspeed port), and CPU ports. Much of the header information that is required to format outgoing packets on the HG ports is held in the HG's XQ. This is because the network device may have 4 HG ports with 2 k XQ entries each, or a total of 8 k HG XQ's, and there are 16 k cells. With all ports potentially HG ports, according to one embodiment, much of the data in the HG XQ's is moved the Packet Header table (indexed by cell address). The functional part of the XQ is broken up into two separate memories: pktLink and pktHDR. Most of the packet information is not contained in the pktHDR which is shared by all ports and queues. The pktLink is used to link one packet to the next to form a linked-list queue. The only portion that is not shared between ports is the pktLink table, so that multicast packets can be linked anywhere in the queue for different ports. This allows all CoS queues within a port to share all of the pktLink entries for that port. Also, the pktLink size is changed to be 4 k per port (the same as the number of cells). With a complete set of packet links (4 k) per port, more of the memory can be flexibly used, enabling maximum utilization with the dynamic threshold scheme. This obviates the need for thresholds on a packet basis. All thresholds are only based on cell counters per queue and per port. Also, there is no need for a first_cell pointer in the XQ entry since the address of the pktLink entry is the same as the first_cell address.

Figure 5:
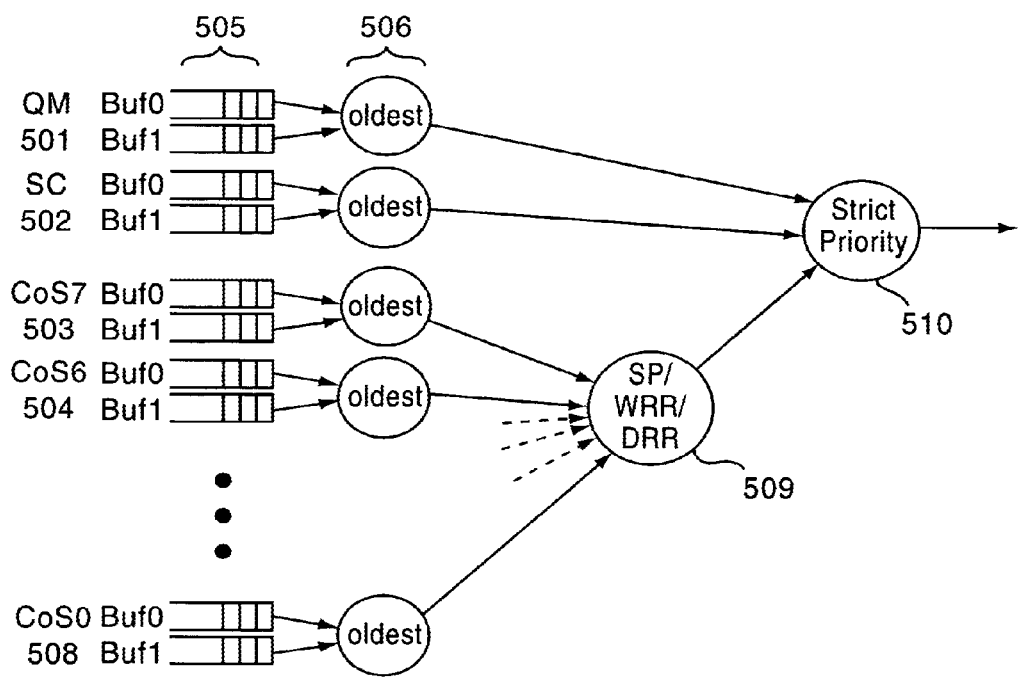
FIG. 5 illustrates the priorities given to different buffers in an exemplary configuration of the present invention.

The scheduling mechanism for each port schedules between the eight best effort queues. This is illustrated in FIG. 5. Features of this include strict priority (SP), weighted round robin (WRR), deficit round robin (DRR), and mixed SP/DRR 509. There is also a minimum rate guarantee and a maximum rate enforcement, and on top of the regular 8 COS queues, 503-508, the SC and QM queues, 501 and 502, are scheduled with strict priority 510. Each port has equivalent sets of queues at each of two crosspoint buffers. In order to fairly schedule between the relative priorities, the MMU first schedules between the logical set of queues, if either physical queue of one class is occupied, the logical class participates in the scheduling round. After a logical queue is selected, one of the two equivalent physical queues is selected if they both have data. This can be done by reading a timestamp at the head of each physical queue 505 and selecting the oldest 506 of the two packets or by doing a simple RR or DRR (with equal weights) between the two equivalent queues. The timestamp method is preferred if the cost is not too high.

Figure 6:
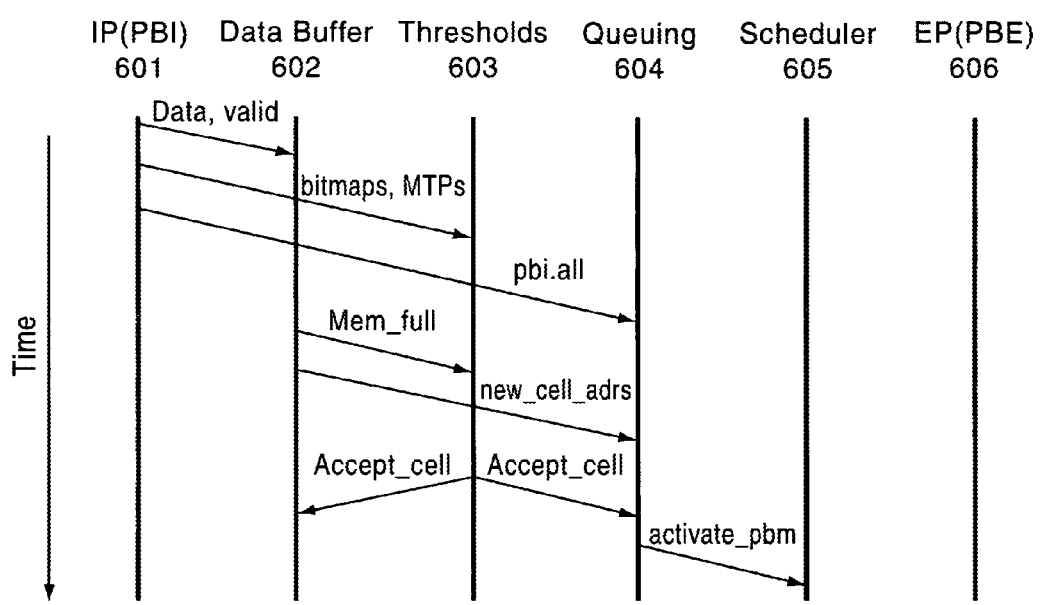
FIG. 6 illustrates steps involved in the ingress packet flow for the MMU in an exemplary embodiment of the present invention.

The ingress control and data flow process is illustrated in FIG. 6. The timeline shows the sequence of events that occur when a cell arrives in the MMU. The following list describes each step in the ingress flow in more detail. A packet arrives from PBI 601, where PBM and COS, go to Threshold block, the Data goes to the buffer block and the Rest of control goes to the Queuing block. The Buffer block 602 allocates a cell and stores data into buffer (CBP), new_cell_adrs is sent to Queuing and buffer_full indication is sent to the Thresholds 603 if no cell is available. The Threshold Block 603 determines if the cell (and whole packet) is accepted or discarded, a cell_accept is sent to Buffer block 602 and Queuing block 604, where if not accepted, cell buffer is recycled. Queuing block gets: PBI information and cell_accept, new_cell_adrs, the Queuing Block adds the cell to input port re-assembly queue, the pktHDR table and the cellHdr table are written to. If this completes a packet (End cell), then Queueing block 604 links the packet to one or more port queues (cut-through can do an early packet link). The Queuing block sends bitmap of newly non-empty ports/queues to Scheduler block 605 for future scheduling. The Thresholds block 603 updates the counters and indicates new flow control state if needed. The Egress Port 605 is discussed below.

Figure 7:
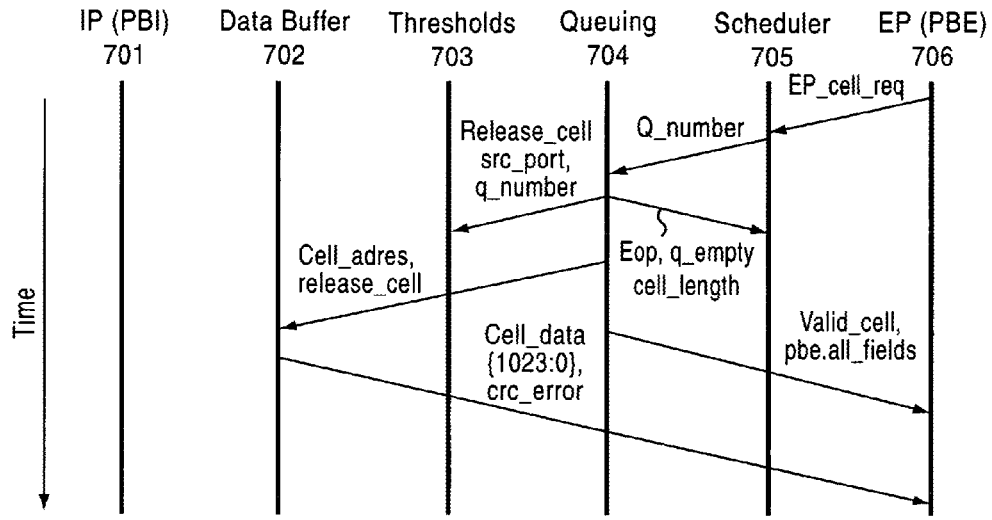
FIG. 7 illustrates steps involved in the egress packet flow for the MMU in an exemplary embodiment of the present invention.

An example of the sequence of events for egress is illustrated in FIG. 7, where data was received previously by the Ingress Port 701. The FIG. 7 timeline shows the sequence of events between the MMU blocks when a cell is scheduled, where a description of the egress flow is provided below. A Cell is requested by the EP 706 for a given port (this should occur before MMU is allowed to schedule a cell) and the Scheduler block 705 selects Port (TDM) and then a queue for that port, and the port/cos value is sent to Queuing block. The Queuing block 704 does the needed lookups for the packet/cell, and responds to Scheduler and the Sends cell_length, EoP, q_empty is sent to the Scheduler 705. The Queuing block sends tx_cell_adrs to buffer block 702 for read and then the Queuing block 704 puts together PBE bus signals and sends PBE to EP in parallel to data from buffer. The Scheduler block sends mux select signals for correct crosspoint. If the last copy of cell has been transmitted, then also the tx_cell_adrs is sent to the Buffer block 702 to be put back into the free cell pool, cell_released, src_port_num, output_port, and q_number are sent to the Thresholds block 703 to decrement port and queue counters and Thresholds block 703 updates the flow control counters and indicates new flow state to flow control generator.

After the output queue thresholds and input port thresholds are calculated for an incoming cell, the admission control block makes a final decision on whether or not to accept the cell into the data buffer. Input for this decision comes from several places that can cause cells to be discarded, including the output-queue thresholds, the input-port thresholds, and the buffer full condition (from CFAP). The top-level admission flow is shown in FIG. 8.

Figure 8:
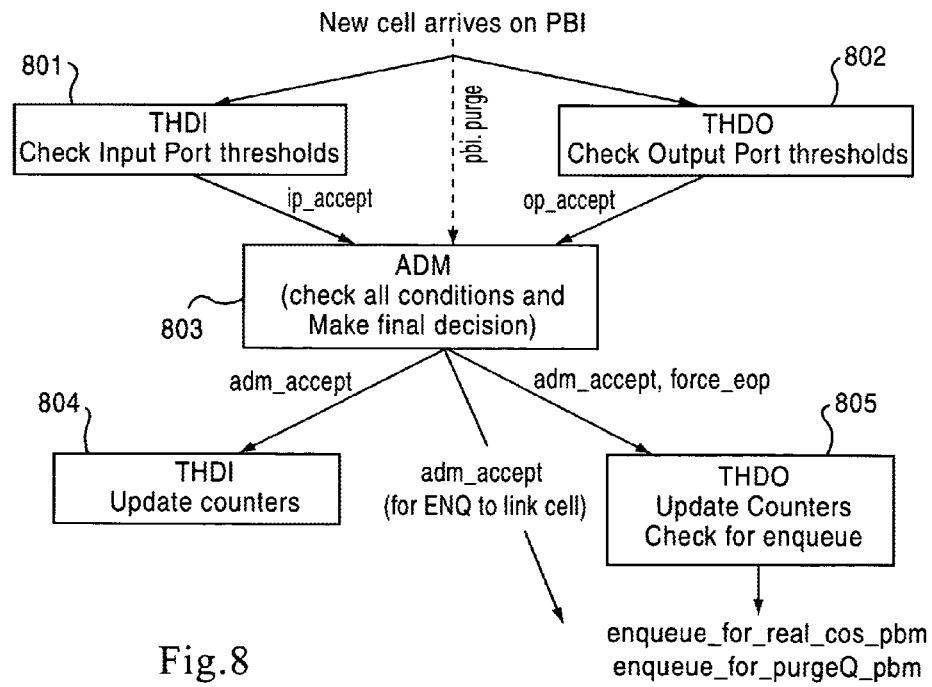
FIG. 8 illustrates an admission flow control process in the MMU in an exemplary embodiment of the present invention.

As illustrated in FIG. 8, a cell arrives from PBI and input-port-based thresholds (THDI, 801) and output-port-based thresholds (THDO, 802) are used to decide if the cells can be accepted. The Admission control block (ADM, 803) takes the THDI and THDO threshold and takes on all other control information into account to make the final cell accept decision. THDI 804 and THDO 805 modules use the final decision to update their own counters and THDO is also used to determine if the packet should be enqueued.

The following inputs are used to make the final accept/discard decision: ip_discard, op_discard, buffer_full, new_ cell_adrs_valid, pbi.purge, and ASF_done. ip_discard is used to determine when to drop for input port thresholds and op_discard is used to determine when to drop for output port thresholds, buffer_full is used when no cell is available from CFAP, memory is full, and any incoming cell will be discarded. When asserted, it stays on until the reset value is reached (has hysteresis). This is actually asserted before the CFAP runs out of cell addresses (the hold-back amount). new_cell_adrs_valid is sent from CFAP, this is usually asserted every cycle. The cell address can be valid even if buffer_full is asserted. If there is really no new cell address available or the CFAP has a parity error, then this signal will not be asserted, which means there is no place to write the current cell from the PBI. The incoming cell will be discarded. This signal has no hysteresis. For pbi.purge, the IP has determined that the packet should be purged (from the PBI bus). For ASF_done, the input from the output thresholds that packet is being enqueued early with this cell for ASF.

Figure 9:
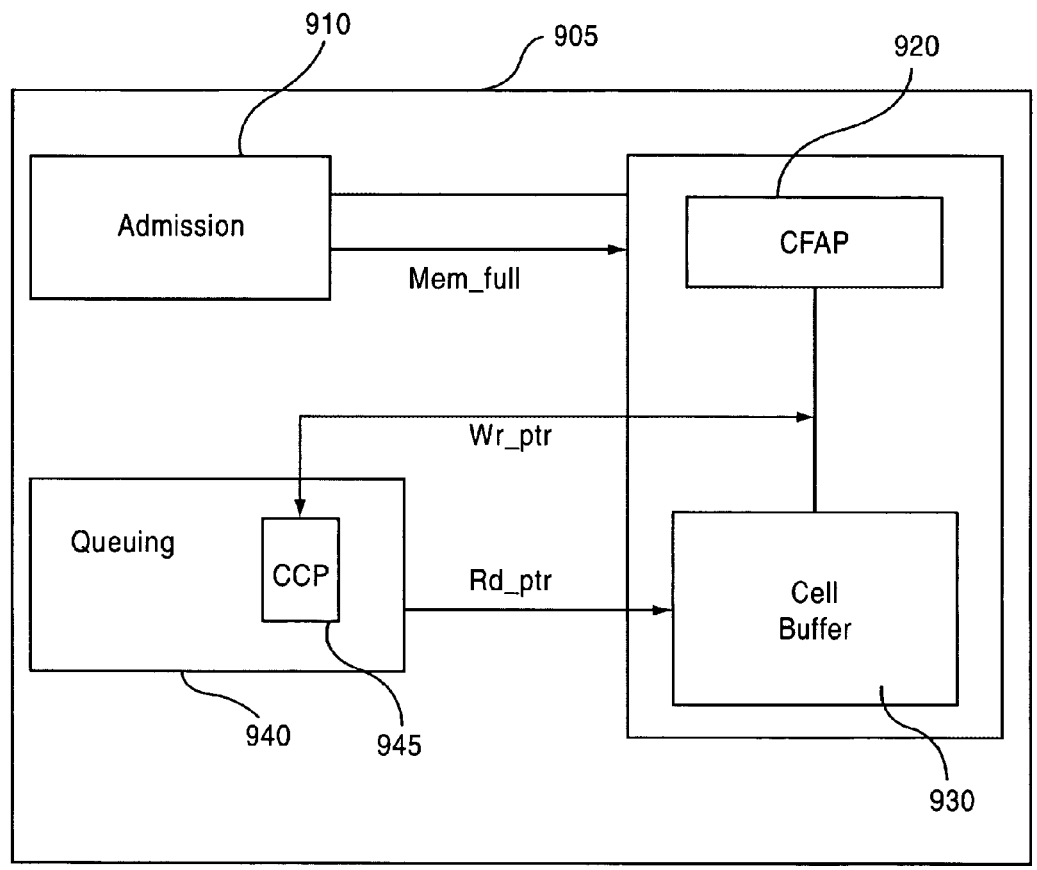
FIG. 9 illustrates a more detailed view of the MMU cross-point buffers.

FIG. 9 illustrates a more detailed view of the MMU cross-point buffers illustrated in FIG. 4. The buffers include a cross-point block 905. The cross-point block includes an Admission block 910, a queuing block 940, an cell free address pool (CFAP) and the cell buffer.

As stated above, after the output queue thresholds and input port thresholds are calculated for an incoming cell, the admission control block (ADM) 910 makes a final decision on whether or not to accept the cell into the data buffer. The cell free address pool (CFAP) 920 is implemented as an array of free cell pointers in order to determine available memory slots in the memory buffer 930.

The queuing block 940 links cells together into packets and links the packets together to form one or more port queues. Further, the queuing block handles most of the control information from the IP on the PBI and also generates all of the control fields for each packet and cell when sending data to the EP. When packets/cells are scheduled for transmission the queuing block retrieves the cell pointer and updates all of the queuing structures. The queuing block also determines if "packet replications" are necessary for the packet i.e, whether the traffic is multicast/broadcast traffic, and also determines when each cell can be returned to the free cell pool for re-use after all ports that need the cell have transmitted it. According to an exemplary embodiment of the present invention the queuing block 940 further includes a cell copy count pool (CCP) 945.

The CCP 945 keeps track of how many copies of each cell have been sent out of the MMU. Further, the CCP keeps track of the number of ports that need to transmit a cell before it can be returned to the CFAP. The functions of the CCP include collecting information from dequeue about cells being sent out, providing the threshold block (THD) with cell length information, providing the CFAP with indication when a cell needs to be freed up provide access to CCP memory and parity/ECC, interrupt handling.

Since modifying the CCP count is a read-modify-write operation that should occur in the output pipeline, there is no free cycle to write the initial value when a cell arrives (in the input pipeline). Therefore, a second value, the port_count, is determined when a cell/packet arrives and is written by the input pipeline and only read by the output pipeline. The port_count value is not actually stored, but can be derived value from the port_bitmaps in the pktHDR1. The CCP memory is initialized to all zeros for all cells. So when the first port transmits a cell, it reads '0' from the CCP, but writes (port_count−1). When the last port reads the CCP, it will read '1', writes '0', and returns the cell to the free pool.

Figure 10A:
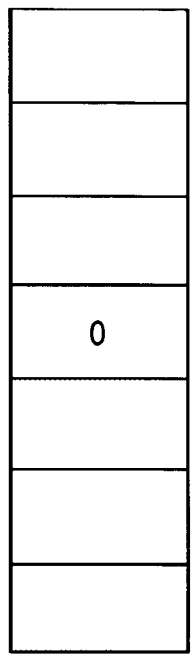
FIGS. 10A-10D illustrate an example of Cell Copy Count Pool (CCP) operation according to an exemplary embodiment of the present invention.
Figure 10B:
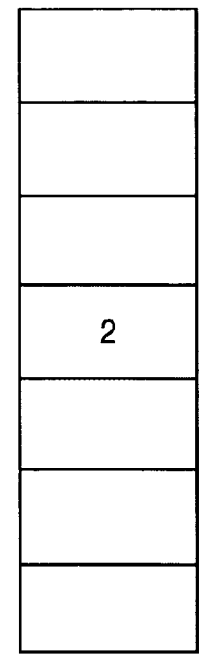
Figure 10C:
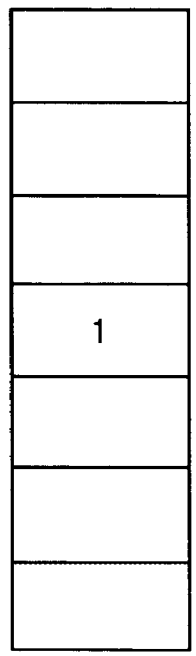
Figure 10D:
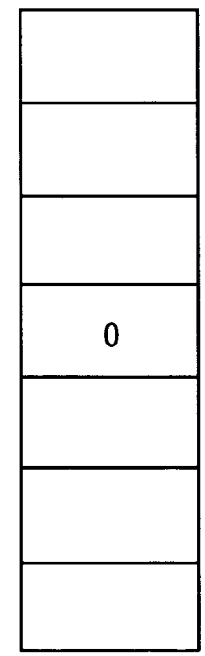

An example of how the CCP operates is further illustrated in FIGS. 10A-10D. According to this example, a cell has a copy count of 3, i.e., the cell is supposed to go out on 3 different egress ports. In FIG. 10A, the cell copy count is initialized to "0". When the first cell goes out of the MMU, the CCP writes a "2" (3−1) into the memory as illustrated in FIG. 10B. When the second cell goes out, the CCP then writes a "1" (2−1) into the memory, as illustrated in FIG. 10C. When the third and final cell leaves the MMU, the CCP writes a "0" (1−1) into memory. Accordingly, the cell copy count is returned to the initial state of 0. Thus, if this cell is used again the same logic described above, can be applied.

Further, at this time according to certain embodiments of the invention, the CCP transmits and indication to the CFAP that this cell can be recycled.

If the CCP is implemented according to the illustrated embodiments, conflicts or "hazards" may exist under certain conditions, some of which hare described below.

For, example, the register files have a Read-Modify-Write latency of 3 clock cycles. In order to avoid any spacing problem or hazards due to the latency, access to the same port, per class-of-service (cos) bucket need to be spaced by 3 to 4 clock cycles.

Further, the CCP RAM according to certain embodiments is implemented with 2 entries per address. Therefore, a hazard may occur between two entries of the same physical address. Still further, since according to this exemplary embodiment, the CCP may receive 2 cells returns per cycle from dequeue. Thus, hazards may occur between cells returned by each EP.

Figure 11:
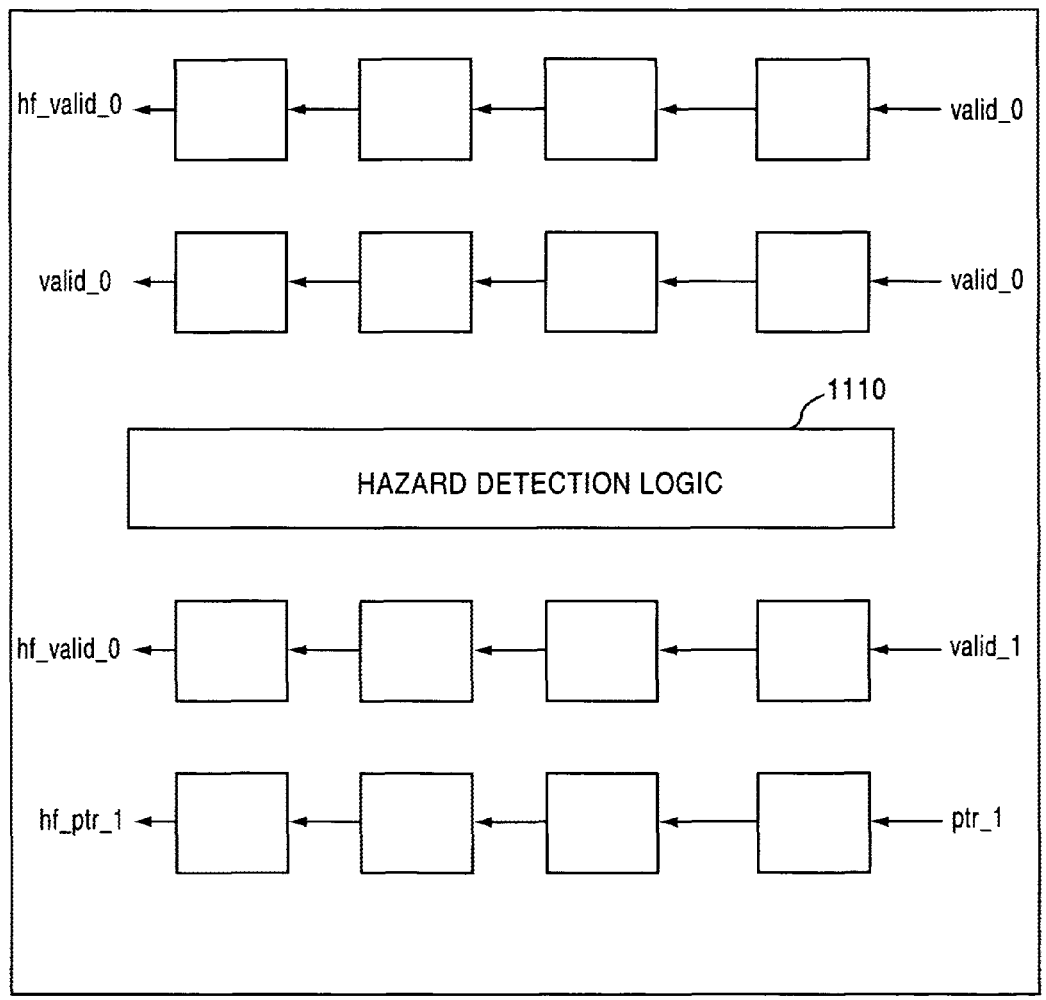
FIG. 11 illustrates a block diagram of the hazard detection logic according to an exemplary embodiment of the present invention.

In order to detect and prevent the above mentioned hazards, as well as other hazard conditions, the CCP according to certain embodiment further includes hazard detection logic. A block diagram of the hazard detection pipeline that includes hazard detection logic is illustrated in FIG. 11.

The hazard detection logic (HDL), detects hazard conditions including, but not limited to, the above examples and ensures the access to the same physical RAM location are spaced apart by at least 3 clock cycles. This is performed, for example by merging requests to the same location. Specifically, in the event that a hazard condition is detected cell requests to the same location are "merged", by decrementing the copy count by more than 1.

Figure 12:
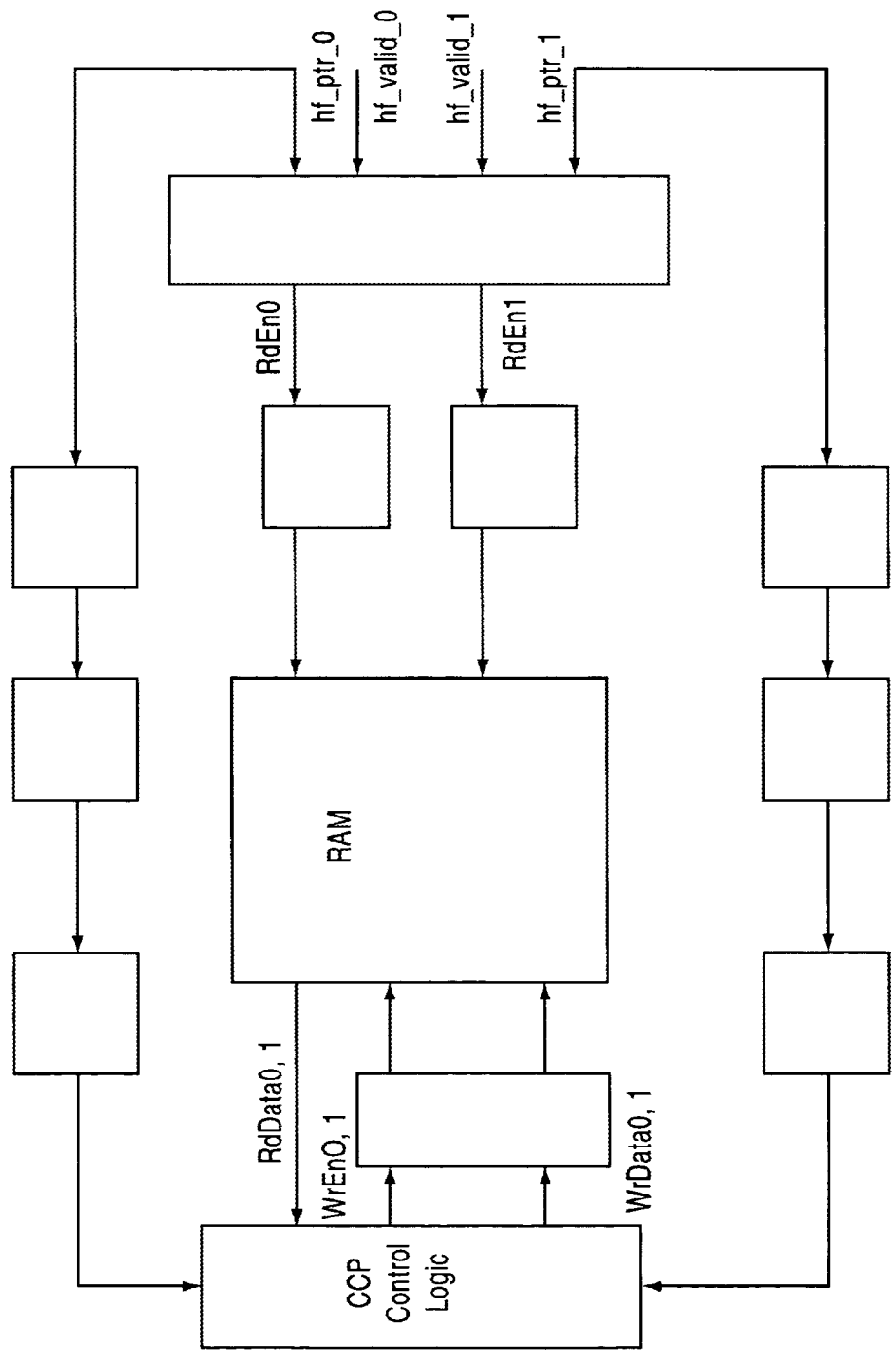
FIG. 12 illustrates a block diagram of the RAM access according to an exemplary embedment of the present invention.

After the CCP determines that either there are no hazard conditions or that the hazard conditions have been detected and avoided, the CCP transmits hazard-free pointers to the CFAP. After the hazard-free pointers are sent, the CCP RAM is read. FIG. 12 illustrates a block diagram of the RAM access according to an exemplary embedment of the present invention.

The valid (vld) signals indicate that the cell indicated in the release_ptr signal has been sent out. Since all copies of the cell have been sent out, the cell can now be freed up from the central buffer pool (CBF)/CFAP.

As discussed above, the CCP indicates when a cell is dequeued. Thus, the CCP includes input signals that indicate that 1) a copy of the cell has been sent out on DEQ0/1 (deq0/deq1_to_ccp_valid) and cell info for the information concerning the cell that was sent out on DEQ0/1 (deq0/deq1_ccp_info). The vld signals are asserted when a copy of the cell has been sent out by deq. The valid signal is asserted only once for all replications of the cell on a particular port. However, the vld signal is asserted once for each output port a cell goes out on. Further, according to certain embodiments of the invention and as shown in FIG. 11, there are vld and ptr signals for each of the EP0 and EP1 pipelines.

The CCP further outputs cell length information to the THD module. The MMU splits the info fields into individual components needed by the THD module. The signal that indicates that a cell has been dequeued is asserted when a copy of the cell has been sent out of the MMU by the DEQ module. It is asserted only once for all of the replications on a particular port. However, it is asserted once each for output port a cell goes on. A signal that indicates that the last copy of a cell is sent in the same cycle as the dequeued signal, but only if one additional condition is satisfied. In addition, to a cell being sent out of the MMU, the cell also needs to have gone out of the last output port. For unicast packets i.e., packets that are directed to only one egress port, this signal is the same as the cell dequeued signal. For multicast packets this signal strobes only once per cell, whereas the cell_dequeued signal strobes N times per cell, where N is the total number of ports in the egress port bitmap.

Returning the FIG. 11, the vld signals are accompanied by hazard free (hf) valid and ptr signals. As discussed above, the HDL 1110 detects hazard conditions.

As discussed above, after the hazard-free pointers are sent to the CFAP, the CCP RAM is read. The read data is obtained 3 clock cycles later, according to this example. The CCP then calculates the value to be written into RAM based on the following algorithm. According to certain embodiments of the present invention, the CCP logic module performs these calculations.

If when the cell entry read (ram_rd_val) equals 0, then the value written into RAM equals (cell copy count—a decrement value);

Else, the value written into RAM equals the value read from the RAM (ram_rd_val)—the decrement value.

The decrement value is the total number of decrement requests which is one or greater. The value is equal to the number of hazards detected within the last 5 stages of cell pointers. As discussed above, according to an exemplary embodiment of the present invention there are two "pipes." Therefore, in this example, the decrement value has a maximum value of ten (10).

According to certain embodiments of the present invention the CCP module computes Error Checking and Correction (ECC) bits for the stored data. The CCPs ECC module has the capability to correct single-bit errors and detect double-bit errors. The number of errors are counted and the memory address of the error location is logged for software usage. Further, the CCP module provides host read/write access to the CCP memory for debug. The ECC algorithm uses an extra parity bit to add double-bit error detection feature to the standard single-bit error correction capability of the ECC. The ECC detection/correction logic consists of error syndrome generation, single bit error correction and double-bit error detection and can be pipelined to meet the timing requirements of the design.

One of average skill in the art will also recognize that the functional building blocks, and other illustrative blocks, modules and components herein, can be implemented as illustrated or by discrete components, application specific integrated circuits, processors executing appropriate software and the like or any combination thereof. For example, a computer program product may be provided for receiving and transmitting data, the computer program product being tangibly embodied on a computer-readable medium and including executable code that, when executed, is configured to cause a networking apparatus to perform the disclosed methods or steps.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus comprising:
a memory management unit (MMU) configured to store data, and
wherein the memory management unit comprises a cell copy count pool (CCP) configured to:
determine when at least one memory cell can be made available based on a copy count of the at least one memory cell, and
maintain the copy count of the at least one cell based on a number of times the at least one memory cell is to be transmitted, wherein the copy count is altered only during transmission of the at least one memory cell to at least one egress port.

2. The apparatus of claim 1, wherein the CCP is configured to collect information regarding how many memory cells have been transmitted to the at least one egress port.

3. The apparatus of claim 1, wherein the CCP is configured to process at least two memory cells during a clock cycle.

4. The apparatus of claim 1, wherein the CCP is further configured to detect a condition when the at least one memory cell is accessed before the at least one memory cell is available.

5. The apparatus of claim 4, wherein the CCP is further configured to:
decrement the copy count by at least two.

6. The apparatus of claim 1, wherein;
the CCP is further configured to determine how many copies of contents of the at least one memory cell are to be transmitted, and
the MMU is further configured to track a number of copies of the at least one memory cell that are transmitted out of the MMU.

7. The apparatus of claim 1, further comprising hazard detection logic configured to detect hazard conditions related to the CCP.

8. The apparatus of claim 1, wherein the CCP is further configured to provide a length of data included in the at least one memory cell to a threshold monitor.

9. An apparatus comprising:
a memory management unit (MMU) configured to store data, and
wherein the memory management unit comprises a cell copy count pool (CCP) configured to:
determine when at least one memory cell can be made available based on a copy count of the at least one memory cell, and
maintain the copy count of the at least one memory cell based on a number of ports that need to transmit the at least one memory cell, wherein the copy count is altered only during transmission of the at least one memory cell to at least one of the ports.

10. The apparatus of claim 9, wherein the CCP is configured to collect information regarding how many memory cells have been transmitted out of the at least one egress module.

11. The apparatus of claim 9, wherein the CCP is configured to process at least two memory cells during a clock cycle.

12. The apparatus of claim 9, wherein the CCP is further configured to detect a condition when the at least one memory cell is accessed before the at least one memory cell is available.

13. The apparatus of claim 12, wherein the CCP is further configured to:
  decrement the copy count by at least two.

14. The apparatus of claim 9, wherein:
  the CCP is further configured to determine how many copies of contents of the at least one memory cell are to be transmitted, and
  the MMU is further configured to track a number of copies of the at least one memory cell that are transmitted out of the MMU.

15. The apparatus of claim 9, further comprising hazard detection logic configured to detect hazard conditions related to the CCP.

16. The apparatus of claim 9, wherein the CCP is further configured to provide a length of data included in the at least one memory cell to a threshold monitor.

17. A computer program product for receiving and transmitting data, the computer program product being tangibly embodied on a computer-readable storage medium and including executable code stored thereon that, when executed, is configured to cause a networking apparatus to:
  store data,
  determine when at least one memory cell can be made available based on a copy count of the at least one memory cell, and
  maintain the copy count of the at least one memory cell based on a number of ports that need to transmit the at least one memory cell, wherein the copy count is altered only during transmission of the at least one memory cell to at least one of the ports.

18. The computer program product of claim 17, wherein the code is configured to cause the networking apparatus to collect information regarding how many memory cells have been transmitted out of at least one of the ports.

19. The computer program product of claim 17, wherein the code is configured to cause the networking apparatus to process at least two memory cells during a clock cycle.

20. The computer program product of claim 17, wherein the code is configured to cause the networking apparatus to detect a condition when the at least one memory cell is accessed before the at least one memory cell is available.

* * * * *